April 4, 1950  A. CHADWICK ET AL  2,502,926
PROCESS FOR FORMING FLEXIBLE BODIES HAVING DECORATIVE
PATTERNS THEREON FROM POLYVINYL CHLORIDE PASTE
Filed July 10, 1947

INVENTORS
Alan Chadwick and Sydney Gair

Patented Apr. 4, 1950

2,502,926

UNITED STATES PATENT OFFICE 2,502,926

PROCESS FOR FORMING FLEXIBLE BODIES HAVING DECORATIVE PATTERNS THEREON FROM POLYVINYL CHLORIDE PASTE

Alan Chadwick, Bramhall, and Sydney Gair, Mere, England

Application July 10, 1947, Serial No. 760,076
In Great Britain July 16, 1946

5 Claims. (Cl. 18—61)

This invention relates to improvements in processes for moulding decorative patterns, motifs or symbols from plastic materials and particularly from a polyvinyl chloride paste.

In known methods of moulding shapes such as sign letters or decorative motifs from plastic materials the material is either first processed into sheet form and is then cut to the required shape by hand or by dies—or the material is moulded or extruded by machines which subject it to heat and pressure.

Both these methods entail the use of costly dies or moulds and presses. Furthermore, when a finish is required such as fabric by spraying with flock—the finish has to be applied after manufacture making a further additional operation and consequently adding to the time and cost of production.

The main object of the present invention is to provide a convenient method of moulding plastic material into desired shapes such as letters, symbols or decorative motifs without the use of complicated and expensive dies, moulds, presses or other equipment and the application of a finish during moulding.

A further object is to provide a convenient method of moulding or shaping letters and other symbols from polyvinyl chloride paste, in which the moulded letters or other shapes are fully flexible and may be fixed to a curved or irregular surface by means of suitable adhesive, preferably of the "pressure sensitive" or self adhesive type.

A further object of the invention is the superimposition of decorative motifs or symbols of polyvinyl chloride paste upon the previously moulded paste.

The process according to the invention comprises applying plastic in paste form to a mould consisting of a plate cut to the shape of the decorative pattern motif or symbol pivoted to a frame carrying a second or base plate upon which the first plate rests, removing surplus paste from the mould, pivoting the mould clear of the second or base plate, spraying the moulded paste with flock to apply a finish thereto and finally curing the moulded paste on the second or base plate by the application of heat.

Figure 1:
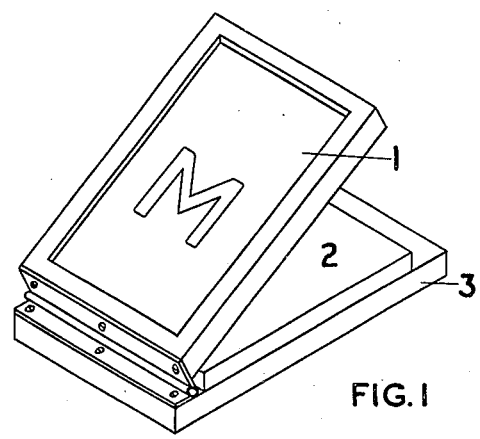
Figure 2:
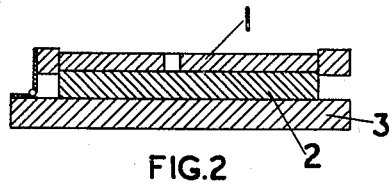
Figure 3:
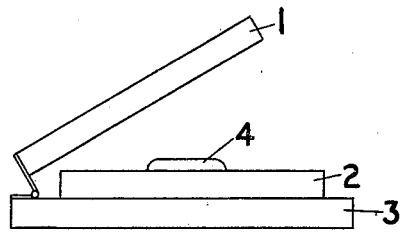
Figure 5:
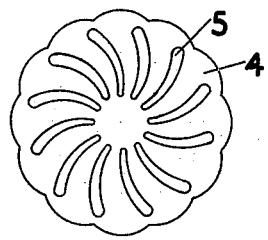
Figure 4:
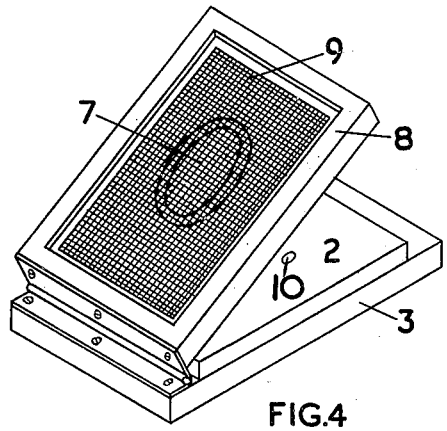
Figure 6:
Figure 7:
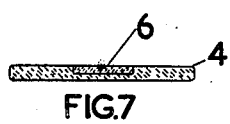

The invention will be described with reference to the accompanying drawings:

Fig. 1 is a perspective view of the mould open;
Fig. 2 is a transverse section of mould closed;
Fig. 3 is a section on line 3—3 Fig. 1 after moulding;
Fig. 4 is a perspective view of modified mould open;
Fig. 5 is a plan of a decorative motif to which is applied a second motif or symbol;
Fig. 6 is a transverse section of same;
Fig. 7 is a transverse section of a moulded motif or symbol applied to moulded paste.

In carrying out the invention a plastic paste such as polyvinyl chloride paste is applied to a moulding plate 1 such as shown in Fig. 2 lying in contact with a base plate 2 resting in a frame 3 pivoted to the moulding plate 1. The moulding plate is stamped or cut out to the shape of the decorative motif or symbol. The paste 4 is rolled or pressed into the mould any surplus paste being removed by a squeegee or knife the mould being then pivoted clear of the base plate as shown in Fig. 3 leaving the moulded paste on the plate 2 which is then removed from the frame 3.

The moulded paste on the plate 2 is then sprayed with flock dyed in any desired colour to give the desired finish to the moulded paste and finally cured in an infra-red heating unit or oven and heated at a temperature of 140°–160° C. for a period of 3 to 5 minutes according to the thickness of the moulded paste.

The moulded sheet is then removed from the plate 2, and after cooling the motifs symbols or shapes are peeled off the sheet, and are flexible and rubber-like in appearance, and waterproof, oil, alkali, and acid resisting. One surface may be coated with suitable adhesive, preferably of the pressure sensitive or self adhesive type so that when they are pressed on to any surface they will adhere thereto.

A sheet of textile or other material may be applied over the plate 2 during moulding in order that the moulded paste may be applied thereto.

Where it is desired to form a relief pattern, motif or symbol Figs. 5 and 6 onto a moulded base such as in the production of table mats or the like the base is moulded as above described, sprayed and cured. The finished base is then replaced on a plate 2 in a second mould and receives a further layer of paste 5 in the form of the relief pattern, motif or symbol. The plate 2 is then removed from the frame 3 sprayed with the same or a different finish as above described and passed through the heating unit or oven to cure the paste which during this process adheres to the moulded base layer from which it cannot be subsequently removed.

If it is desired to have an inlaid pattern motif or symbol 6 in the base layer the pattern, motif or symbol is moulded as above described, sprayed and cured and then applied to a moulded base layer on the plate 2 whilst this latter is still in paste form. The moulded material on the plate 2 is then sprayed and cured as above described the sprayed material adhering to the uncured paste but not to the already cured pattern motif or symbol.

Difficulty is experienced in moulding motifs or symbols where part of the mould is entirely surrounded by paste such as the centre portion 7 of the letter O Fig. 4. In order to locate this portion 7 the moulding plate 1 is formed as a frame 8 supporting a sheet of metal or textile gauze or netting 9 to which the moulding pieces are secured on the underside by solder or other suitable adhesive the paste being rolled or pressed through the gauze or netting onto the plate 1. Before applying the paste to the mould the frame 8 and gauze or netting 9 are pivoted into contact with the plate 2. After moulding the frame 8 is raised as described with reference to the plate 1 thereby raising the gauze or netting 9 and the mould portions and leaving the moulded paste on the plate 2 as above described.

Where a sheet of gauze or netting 9 is employed the masking portions of the mould are not necessarily formed of metal but may be cut from cardboard paper or other material the gauze or netting to which they are attached providing the requisite rigidity.

The suction between the moulded paste and the moulding plate 1 or the mould portion 7 attached to the gauze or netting 9 may be such that in raising the plate 1 or frame 8 and gauze or netting 9 the paste may tend to come away from the plate 2; this is more likely to occur where the portion of the mould is surrounded by paste such as the centre of the letter O. In order to prevent the paste from tending to be lifted off the plate 2 a series of small holes such as 10 may be formed in the base plate 2 to allow air to reach the paste and moulding portions thereby preventing suction between the edges of the openings in the moulding portions and the paste.

The outer edges of the moulded paste are rounded or chamfered owing to the paste subsidizing on the removal of the moulding plate 1 or the frame 8 and gauze or netting 9.

In the claims the term pattern effects includes decorative motifs symbols or shapes and a pulverized finish is intended to include the spraying of the moulded paste with dyed flock in powder or other form.

We claim:

1. A process for forming flexible bodies having distinct decorative patterns comprising in combination, the steps of successively applying layers of a thermoplastic polyvinyl compound in paste form to a base through distinct mold plates having cut-out portions of the shape of the patterns to be formed; withdrawing in each case the mold plate after formation of the layer; spraying the molded paste of each layer with pulverized flock; and curing the molded paste of each layer on the base by the application of heat, each successive layer except the first being applied on top of the preceding layer.

2. A process for forming flexible bodies having a decorative pattern in relief comprising in combination, the steps of applying a thermoplastic polyvinyl compound in paste form to a base through a mold plate having cut-out portions of the shape of the base layer to be formed; thereafter withdrawing the mold plate from the base; spraying the molded paste with pulverized flock; curing the molded paste on the base by the application of heat; and thereafter superimposing a second layer on the thus formed base layer so as to constitute a relief pattern layer, the said pattern layer being formed on said base layer in the same sequence of steps as said base layer, and the spraying with pulverized flock performed in said superimposing operation adhering to the yet uncured molded paste formed in the course of formation of said pattern layer and being readily removable from the previously cured base layer.

3. A process for forming flexible bodies having a decorative inlaid pattern comprising in combination, the steps of applying a thermoplastic polyvinyl compound in paste form to a base through a mold plate having cut-out portions of the shape of the inlaid pattern to be formed; thereafter withdrawing the mold plate from the base; then spraying the molded paste with pulverized flock; then curing the paste on the base by the application of heat; thereafter impressing the pattern layer into a thermoplastic polyvinyl material formed on a base in the same manner as said pattern layer so as to constitute a base layer for said pattern layer, the impression step being performed prior to spraying and curing of the said base layer; thereafter spraying the base layer with pulverized flock; then curing the base layer by application of heat; and finally removing the combined assembly of layers from the base.

4. A process for forming flexible bodies having a decorative inlaid pattern comprising in combination, the steps of applying a thermoplastic polyvinyl compound in paste form to a base through a mold plate having cut-out portions of the shape of the inlaid pattern to be formed; thereafter withdrawing the mold plate from the base; curing the molded paste on the base by the application of heat; and thereafter superimposing a second layer on the thus formed base layer so as to constitute an inlaid pattern layer, the said pattern layer being formed on said base layer in the same sequence of steps as said base layer.

5. A process for forming flexible bodies having a decorative inlaid pattern comprising in combination, the steps of applying a thermoplastic polyvinyl compound in paste form to a base through a mold plate having cut-out portions of the shape of the inlaid pattern to be formed; thereafter withdrawing the mold plate from the base; then curing the paste on the base by the application of heat; then removing the thus formed pattern layer from the base; thereafter impressing the pattern layer into a thermoplastic polyvinyl material formed on a base in the same manner as said pattern layer so as to constitute a base layer for said pattern layer, the impression step being performed prior to curing of the said base layer; then curing the base layer by application of heat; and finally removing the combined assembly of layers from the base.

ALAN CHADWICK.
SYDNEY GAIR.

REFERENCES CITED

The following references are of record in the file of this patent:

UNITED STATES PATENTS

| Number | Name | Date |
|---|---|---|
| 1,533,700 | Dibble et al. | Apr. 14, 1925 |
| 1,895,711 | Foley | Jan. 31, 1933 |
| 2,283,286 | Porth | May 19, 1942 |

FOREIGN PATENTS

| Number | Country | Date |
|---|---|---|
| 21,370 | Great Britain | 1911 |
| 500,298 | Great Britain | Feb. 7, 1939 |